(12) United States Patent  (10) Patent No.: US 9,124,203 B2
Saito  (45) Date of Patent: Sep. 1, 2015

(54) MOTOR HAVING PULSE MODE AND BRUSHLESS MODE, AND CONTROL METHOD AND APPARATUS OF THE MOTOR

(71) Applicant: CANON KABUSHIKI KAISHA, Tokyo (JP)

(72) Inventor: Naoki Saito, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 128 days.

(21) Appl. No.: 14/068,960

(22) Filed: Oct. 31, 2013

(65) Prior Publication Data

US 2014/0055075 A1 Feb. 27, 2014

Related U.S. Application Data

(62) Division of application No. 13/005,189, filed on Jan. 12, 2011, now Pat. No. 8,605,376.

(30) Foreign Application Priority Data

Jan. 20, 2010 (JP) .................................. 2010-009846
Mar. 11, 2010 (JP) .................................. 2010-054581

(51) Int. Cl.
| | | |
|---|---|---|
| *H02K 29/10* | (2006.01) | |
| *H02P 8/14* | (2006.01) | |
| *G02B 7/10* | (2006.01) | |
| *H02P 6/14* | (2006.01) | |

(52) U.S. Cl.
CPC ............ *H02P 8/14* (2013.01); *G02B 7/102* (2013.01); *H02P 6/14* (2013.01)

(58) Field of Classification Search
USPC .......... 318/400.4, 824, 400.38, 652, 721, 823
See application file for complete search history.

(56) References Cited

U.S. PATENT DOCUMENTS

| | | | |
|---|---|---|---|
| 5,220,634 A | 6/1993 | Yaguchi et al. | |
| 6,271,641 B1 * | 8/2001 | Yasohara et al. | 318/685 |
| 7,050,929 B2 | 5/2006 | Norell et al. | |
| 7,208,907 B2 | 4/2007 | Norell et al. | |
| 2004/0061470 A1 * | 4/2004 | Ito et al. | 318/565 |

FOREIGN PATENT DOCUMENTS

| | | |
|---|---|---|
| JP | 6-067259 B2 | 8/1994 |
| JP | 2002-359997 A | 12/2002 |

* cited by examiner

*Primary Examiner* — Kawing Chan
*Assistant Examiner* — Jorge L Carrasquillo
(74) *Attorney, Agent, or Firm* — Rossi, Kimms & McDowell LLP

(57) ABSTRACT

A motor includes a rotor having a magnet, a stator having two coils, and a controller configured to control excitations of the two coils. The stator includes first and second yokes excited by the coils, and first and second rotor detectors configured to detect a magnetic flux. The first yoke is arranged for each electric angle of 360°, and the second yoke shifts from the first yoke by an electric angle of 90°. The first rotor position detector is arranged at the same position as the first yoke. The controller generates an excitation switching signal for each coil based on detection signals from the first and second rotor position detectors, and excites a corresponding coil, and obtains first and second delay angles.

8 Claims, 15 Drawing Sheets

MOTOR HAVING PULSE MODE AND BRUSHLESS MODE, AND CONTROL METHOD AND APPARATUS OF THE MOTOR

BACKGROUND OF THE INVENTION

1. Field of the Invention

The present invention relates to a motor having a pulse mode and a brushless mode, and a motor control method or apparatus configured to control driving of the motor, and an optical apparatus using the motor control unit.

2. Description of the Related Art

Digital positional control over a stepping motor can be easily provided using an open loop control. Therefore, the stepping motor is widely used for an optical apparatus such as a camera, an exchange lens, an optical disk drive, a printer, and a projector.

The stepping motor may step out when the load to the stepping motor increases and the stepping motor is rotated at a high speed. One proposed, step-out preventive method attaches an encoder configured to detect a rotor's rotating position to the stepping motor, and switches electrification states to coils according to the rotor's rotating position so as to make the stepping motor act like a so-called brushless DC motor. In the following description, a driving mode of the stepping motor using the open loop control will be referred to as a pulse mode, and a driving mode using the control similar to the brushless DC motor will be referred to as a brushless mode.

Each of Japanese Patent Publication No. 06-067259 and Japanese Patent Laid-Open No. 2002-359997 discloses a motor control unit configured to advance according to the velocity a phase of a signal obtained by a noncontact sensor, such as a Hall device in the motor and to switch the current supplied to each coil according to the signal. The motor control unit solves a delay of leading of the current, and realizes high-speed rotation of the motor. At this time, a phase of the current (pulse) which is advanced in accordance with the velocity is referred to as a fast angle.

The motor control unit disclosed in Japanese Patent Publication No. 06-067259 utilizes a Hall device configured to output a two-phase signal that shifts by a phase of an electric angle of 90°. In the circuit configured to output a signal according to the rotating velocity of the rotor, a fast signal is digitally generated for each predetermined phase angle from the output signal of the Hall device, and the signal is selected and output so as to advance the phase.

The motor control circuit disclosed in Japanese Patent Laid-Open No. 2002-359997 measures a phase difference timing of the output signal of the Hall device using a timer, calculates a fast angle timing suitable for a fast angle amount stored in a memory based on the measurement value of the timer, and generates the fast signal so as to advance the phase. Each fast angle amount is set so that it can correspond to a velocity region of a rotation of the rotor, or so that a fast angle amount is separately set to a forward rotating direction and a backward rotating direction of the rotor.

Each of the motor control units disclosed in Japanese Patent Publication No. 06-067259 and Japanese Patent Laid-Open No. 2002-359997 generates a fast signal from the output signal of the Hall device by setting a preset fast angle. However, according to this method, lots of fast angle values to be prepared are necessary for finer positioning controls.

Alternatively, a delay angle that is a phase difference between the output signal of the Hall device and a delay drive pulse signal for driving the motor for the output signal of the Hall device may be varied (increased or decreased) by increasing or decreasing the delay angle by a predetermined value whenever the polarity of the drive pulse signal changes. In other words, a delay angle operation for advancing the phase by micro-changing the delay angle may be performed whenever the drive pulse signal is generated.

However, as the delay angle operation proceeds in the acceleration or deceleration control, a phase relationship turns between the drive pulse signal for driving the motor and the output single of the Hall device. In this case, the motor becomes out of control and the motor cannot be accelerated to a target maximum velocity because a drive pulse signal is generated based on the output timing of the reference output signal of the Hall device.

In addition, when the pulse mode is transferred to the brushless mode, it is necessary to select the reference output signal of the Hall device used to generate the pulsed signal for the drive pulse signal to be generated. In this case, when the output signal of the Hall device distant with respect to the signal output timing from the drive pulse signal to be generated is selected, a large delay angle can be obtained due to the phase difference from its position. Thereby, turning of the phase relationship between the drive pulse signal and the output signal of the Hall device may be delayed, or the motor becomes likely to be accelerated to the target maximum velocity without causing a reversal of the phase relationship even when the output signal of the Hall device is not switched.

Nevertheless, the delay angle obtained in transferring the pulse mode to the brushless motor contains a detection error, the influence of the detection error increases as the delay angle operation continues longer. Thereby, a phase difference shifts from the electric angle of 90° between the two-phase drive pulse signal (A-phase drive pulse signal and B-phase drive pulse signal).

SUMMARY OF THE INVENTION

The present invention provides a motor that can be velocity-controlled in a brushless mode with no phase shift, and a motor control method or apparatus configured to control driving of the motor, and an optical apparatus using the motor control apparatus.

A motor according to one aspect of the present invention includes a rotor having a magnet circumferentially magnetized with a plurality of poles, a stator including two coils, and a controller configured to control an excitation to each of the two coils separately. The stator further includes a first yoke excited by one of the two coils, a second yoke excited by the other of the two coils, a first rotor detector, and a second rotor detector, each of the first and second rotor detectors being configured to detect polarity changes of a magnetic flux by the magnet as the rotor rotates. The first yoke includes a plurality of magnetic pole tips whose centers are spaced from each other by an electric angle of 360° in a stator circumferential direction, and the second yoke includes a plurality of magnetic pole tips whose centers shift from the centers of the magnetic pole tips of the first yoke in the same direction in the stator circumferential direction by the electric angle of 90°. A center of the first rotor position detector is arranged at the same position as one of the centers of the magnetic pole tips of the first yoke in the stator circumferential direction, and a center of the second rotor position detector is arranged at the same position as one of the centers of the magnetic pole tips of the second yoke in the stator circumferential direction. The controller includes a signal switching unit configured to generate an excitation switching signal used to switch the excitation to each coil, an excitation unit configured to excite a corresponding coil in accordance with the excitation switching signal, and a delay angle operator configured to obtain a first delay angle and a second delay angle whenever the excitation switching signal corresponding to each coil is generated, the first delay angle being a delay amount of the excitation switching signal based on a just past polarity change of a first signal detected by the first rotor position detector, and a second delay angle being a delay amount of the excitation switching signal based on a just past polarity change of a second signal detected by the second rotor position detector. The signal switching unit generates the excitation switching signal using the first delay angle for the first signal or the second delay angle for the second signal.

A control method of the above motor according to another aspect of the present invention includes the steps of generating an excitation switching signal used to switch the excitation to each coil, exciting a corresponding coil in accordance with the excitation switching signal, obtaining a first delay angle and a second delay angle whenever the excitation switching signal corresponding to each coil is generated, the first delay angle being a delay amount of the excitation switching signal based on a just past polarity change of a first signal detected by the first rotor position detector, and a second delay angle being a delay amount of the excitation switching signal based on a just past polarity change of a second signal detected by the second rotor position detector, and generating the excitation switching signal using the first delay angle for the first signal or the second delay angle for the second signal.

A control apparatus according to another aspect of the present invention configured to control driving of a motor that includes a rotor having a magnet, a first coil, and a second coil. The control apparatus includes first and second rotor position detectors arranged with different phases and configured to detect rotating positions of the rotor, a drive pulse signal generator configured to use as a reference signal one of a first signal output from the first rotor position detector and a second signal output from the second rotor position detector, and to generate a third signal that is a pulse signal used to drive the motor, a delay angle operator configured to change a delay angle that is a phase difference between the reference signal and the third signal, a driver configured to drive the motor based on the third signal, a signal switching unit configured to provide reference signal switching that switches the reference signal between the first signal and the second signal, and an initial delay angle setting unit configured to set a delay angle between the third signal and a signal different from a signal that is the reference signal just before the reference signal switching among the first signal and the second signal, to be an initial delay angle just after the reference signal switching.

Another control apparatus of the present invention includes, instead of the signal switching unit and the initial delay angle setting unit, a driving mode transfer unit configured to start driving the motor in a first driving mode that switches an electrification to each of the first and second coils at a predetermined time interval, to subsequently drive the motor in a second driving mode that switches the electrification in accordance with the delay angle, and to accelerate the motor to a target velocity, wherein the driving mode transfer unit sets as an initial delay angle of the second driving mode the delay angle between the third signal just before the first driving mode is transferred to the second driving mode and one of the first and second signals which provides a smaller delay angle with the third signal.

An optical apparatus configured to control driving of the motor that is adapted to move an optical element using the above control apparatus also constitute one aspect of the present invention.

Further features of the present invention will become apparent from the following description of exemplary embodiments with reference to the attached drawings.

DESCRIPTION OF THE EMBODIMENTS

A description will be given of the embodiment of the present invention with reference to the accompanying drawings.

Structure of Stepping Motor

Figure 1:
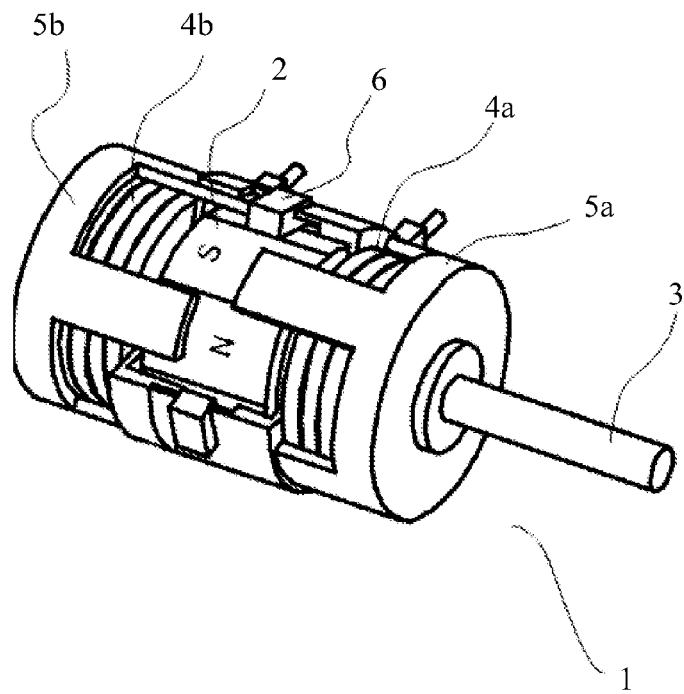
FIG. 1 is an overview of a stepping motor that is controlled by a motor control apparatus according to one embodiment of the present invention.

FIG. 1 illustrates a structure of a stepping motor that is controlled by the motor control apparatus according to this embodiment of the present invention. For description purposes, part of the stepping motor is broken.

In FIG. 1, the stepping motor 1 includes a rotor 3 having a magnet 2, a first coil 4a, a second coil 4b, a first yoke 5a, a second yoke 5b, and a magnetic sensor 6. The first coil 4a, the second coil 4b, the first yoke 5a, the second yoke 5b, and the magnetic sensor 6 constitute a stator.

The magnet is a cylindrical magnet that is magnetized with a plurality of poles (n poles) in the circumferential direction at its outer circumference, and the radial magnetic intensity changes like a sine wave shape relative to a rotating position (angular position) of the magnet 2. In this embodiment, n=8.

The rotor 3 is rotatably supported on the stator, and fixed with the magnet 2.

Each of the first coil 4a and the second coil 4b is made by winding a lead wire around a bobbin (not illustrated) a multiple number of times.

The first yoke 5a has a plurality of magnetic pole tips that are excited when the first coil 4a is electrified. By switching the excited pole, the torque given to the rotor 3 can be varied. Similarly, the second yoke 5b has a plurality of magnetic tips that are excited when the second coil 4b is electrified. By switching the excited pole, the torque given to the rotor 3 can be varied.

The magnetic sensor 6 is a Hall device, and serves as a noncontact type rotating-position detector configured to detect a rotating position of the rotor 3 by detecting a change of the magnetic flux from the magnet 2. One magnetic sensor 6 includes a first magnetic pole sensor (first rotor position detector) 6a, and a second magnetic pole sensor (second rotor position detector) 6b.

The first and second magnetic pole sensors 6a, 6b detect changes of the magnetic field (flux density) as the magnet 2 rotates. The first and second magnetic pole sensors 6a, 6b correspond to the first and second rotor position detectors, respectively.

The magnetic sensor 6 has two output terminals, and these two output terminals output voltages according to the flux density detected by the first and second magnetic pole sensors 6a, 6b. Each magnetic pole sensor when detecting the N pole outputs the positive voltage, and each magnetic pole sensor when detecting the S pole outputs the negative voltage. In this embodiment, an output of the magnetic sensor 6 is a binarized output, in which a high signal is output for the N pole and a low signal is output for the S pole. This embodiment provides digital control over the stepping motor 1 based on these signals.

The magnetic sensor 6 may be a sensor configured to output an analogue signal, and the stepping motor 1 may be controlled by the analogue control based on the signal.

Figure 2:
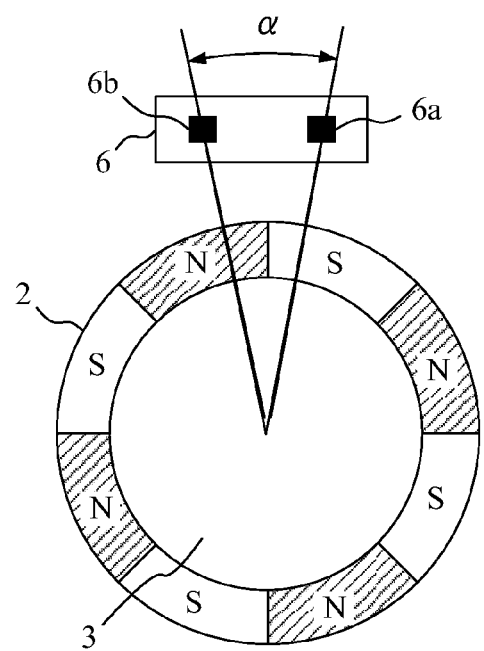
FIG. 2 is a sectional view of the stepping motor illustrated in FIG. 1.

FIG. 2 illustrates a section of the stepping motor 1 illustrated in FIG. 1 taken by a plane that passes the first and second magnetic pole sensors 6a, 6b of the magnetic sensor 6 and is orthogonal to the center axis of the rotor 3. FIG. 2 illustrates a positional relationship among the magnet 2, the rotor 3, and the magnetic sensor 6. The first and second magnetic pole sensors 6a, 6b of the magnetic sensor 6 are distant by a predetermined distance and a predetermined angle α.

Phase Relationship of Hall Device Signal

Figure 3:
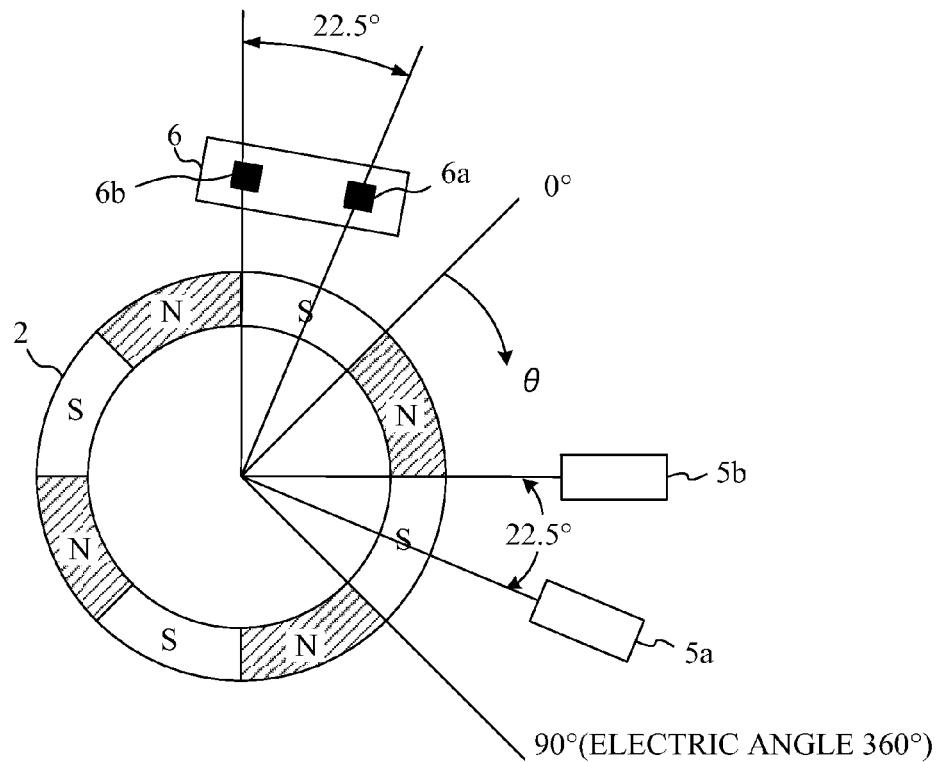
FIG. 3 is a sectional view for explaining digital control of the stepping motor illustrated in FIG. 1.

FIG. 3 illustrates an arrangement among the two magnetic pole sensors 6a, 6b in the magnetic sensor 6 and the first and second yokes 5a, 5b in the stepping motor 1 in this embodiment. The positions on the stator of the magnetic pole sensors 6a, 6b of the magnetic sensor 6 and the yokes 5a, 5b are expressed as follows with respect to the center position of the stator circumferential direction. The first and second sensing magnet poles 6a, 6b, are separated by a physical angle of 22.5° (or a different phase). The first yoke 5a is located distant from the first magnetic pole sensor 6a by 67.5°, and the second yoke 5b is distant from the first yoke 5a by 22.5°.

22.5° corresponds to 90° when it is converted into an electric angle where one wavelength of the sensor output is set to the electric angle of 360°. The first and second yokes 5a, 5b are arranged four each, for each physical angle of 90° (for each electric angle of 360°).

Assume that the state of the magnet 2 illustrated in FIG. 3 has θ of 0°, and θ increases when the magnet 2 rotates in the arrow direction illustrated in FIG. 3. θ is an electric angle and when it moves by 90°, the electric angle changes by 360°.

Each of the output signals from the first and second magnetic pole sensors 6a, 6b of the magnetic sensor 6 will be referred to as a Hall device signal hereinafter. The output signals from the first and second magnetic pole sensors 6a, 6b correspond to the first and second signals.

Structure of Brushless Mode

Figure 4:
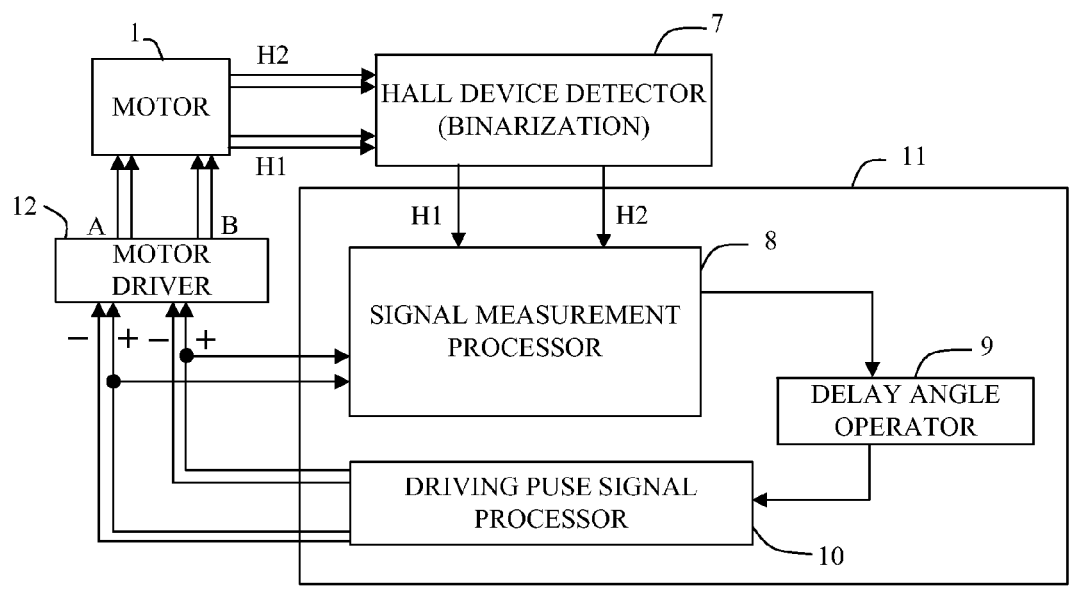
FIG. 4 is a block diagram that illustrates a structure for a brushless control of the stepping motor in the motor control apparatus according to this embodiment.

FIG. 4 illustrates an entire structure of the motor control apparatus for the brushless control. The Hall device signals H1, H2 from the first and second magnetic pole sensors 6a, 6b of the magnetic sensor 6 of the stepping motor 1 are binarized by the Hall device signal detector 7. The binarized Hall device signal is sent to the signal measurement processor 8 in a microcomputer 11. In this embodiment, whenever the polarity of the Hall device signal changes, a timer count value is obtained and updated.

The signal measurement processor 8 also measures the drive pulse signal output from the drive pulse output processor 10. In this embodiment, whenever the polarity of the Hall device signal changes, a timer count value is obtained and updated.

The drive pulse signal is a signal generated so as to make the stepping motor 1 perform the excitation switching (switching of the electrification states of the first and second coils 4a, 4b) and corresponds to a third signal.

A delay angle operator 9 determines a delay angle from the Hall device signal and the timer count value of the drive pulse signal. The delay angle, as used herein, is a phase difference between the Hall device signal and the drive pulse signal, or a delay amount of the drive pulse signal based on the magnetism change time of the Hall device signal. The delay angle may be obtained as time data or data representative of the electric angle. This embodiment discusses the delay angle obtained as the electric angle data.

The drive pulse output processor (or drive pulse signal generator) 10 generates A-phase and B-phase drive pulse signals based on the determined delay angles, and outputs these signals to the motor driver 12. The motor driver 12 (excitation unit) switches the excitation of the stepping motor 1 based on the drive pulse signal.

From the foregoing in mind, a relationship between the Hall device signal and the drive pulse signal and the control method of the stepping motor 1 will be described.

Pulse Mode

The driving of the stepping motor 1 illustrated in FIG. 1 can be controlled in the pulse mode (first driving mode). The pulse mode is a mode corresponding to an open loop control of the usual stepping motor, and used to switch the electrification states of the first and second coils 4a, 4b at predetermined time intervals. In other words, the target velocity of the rotor 3 is rotated at a target velocity by sequentially switching the electrifications of the first and second coils 4a, 4b in accordance with the input drive pulse interval (drive frequency) and the rotating direction. In addition, the rotor 3 can be rotated by a target angle in accordance with the number of input drive pulses.

Brushless Mode

The driving of the stepping motor 1 can be also controlled in the brushless mode (second driving mode). In other words, the electrification states of the first and second coils 4a, 4b are sequentially switched in accordance with the number of input drive pulses, the rotating direction, and a delay angle determined by the delay angle operator 9 from the Hall device signal and the timer count values of the drive pulse signal. Thereby, the rotor 3 can be rotated by a target angle.

Thus, the brushless mode is a mode that generates the drive pulse signal (third signal) based on the change of the polity of the Hall device signal, and drives the stepping motor 1. The generated drive pulse signal is a (delay signal) that delays relative to the Hall device signal.

In this embodiment, one drive pulse signal is generated relative to one Hall device signal, but another generating method may be adopted. In addition, the torque—the number of rotations characteristic may be changed by controlling the delay angle through the delay angle operator 9.

Motor Driving Sequence

Figure 6:
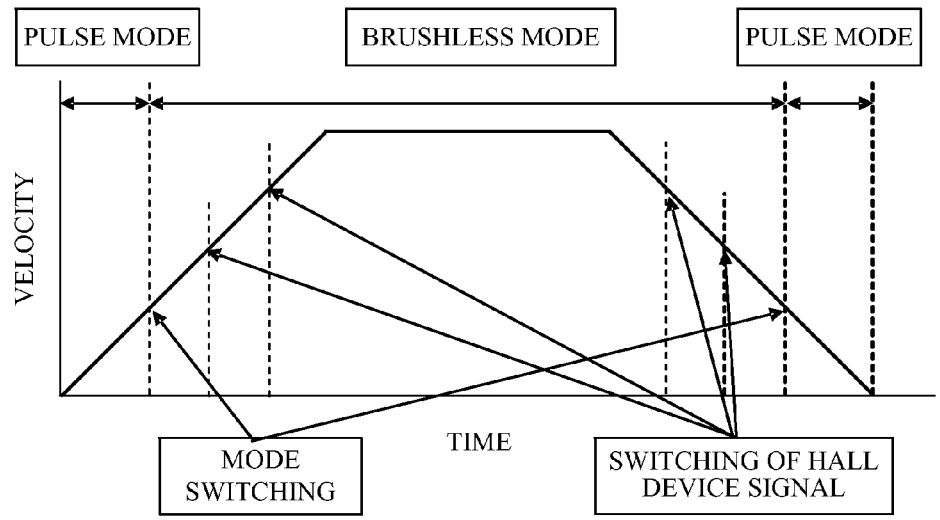
FIG. 6 is a view that illustrates a sequence of the entire control of the stepping motor by the motor control apparatus according to this embodiment.

FIG. 6 illustrates a driving sequence from starting to stopping of the stepping motor 1 according to this embodiment. This embodiment starts the acceleration control with the pulse mode, and transfers the pulse mode to the brushless mode. In the brushless mode, the stepping motor 1 is accelerated to the target (maximum) velocity by switching the Hall device signal that is a reference signal used to generate the drive pulse signal, which is one of the two output signals from the two magnetic pole sensors 6a, 6b of the magnetic sensor 6. The Hall device signal that is a reference signal used to generate the drive pulse signal will be referred to as a reference Hall device signal hereinafter.

Thereafter, similar to the acceleration control, the deceleration control follows to a transfer point to the pulse mode by switching the reference Hall device signal. Again, the mode is switched to the pulse mode, and the stepping motor 1 is stopped when the number of input drive pulses is reached.

Coil Excitation Correction

Figure 18A:
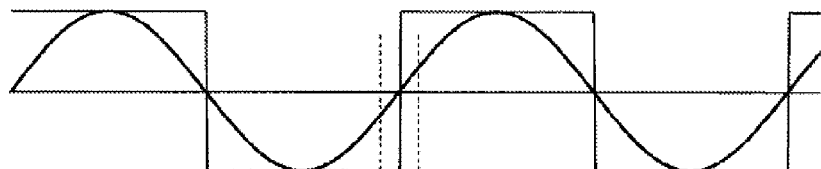
FIGS. 18A and 18B are waveform diagrams each of which illustrates an offset of a Hall device signal in the coil excitation.
Figure 18B:
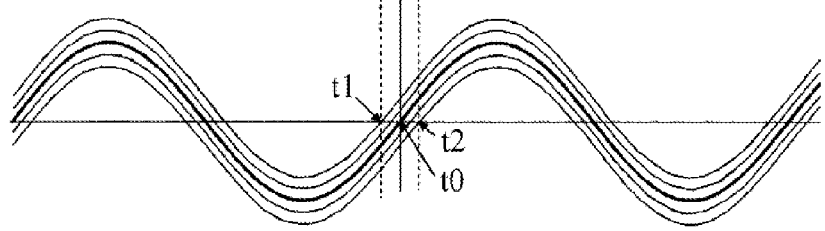

From the foregoing in mind, a description will be given of an error in the signal output from the Hall device caused by the influence of the coil excitation. FIGS. 18A and 18B illustrates the influence of the output signal from the Hall device caused by the coil excitation. A waveform in FIG. 18A is an output signal from the Hall device in the non-excitation state, and a thin line in FIG. 18B is an output signal from the Hall device after the coil is excited. Under the influence of the coil excitation, the analogue output of the Hall device signal is offset. As a result, the original polarity switching point (t0) shifts to the front or back (t1–t2), and the actual output (data binarized by the Hall device signal detector 7) has an error in the time axis direction.

Figure 19:
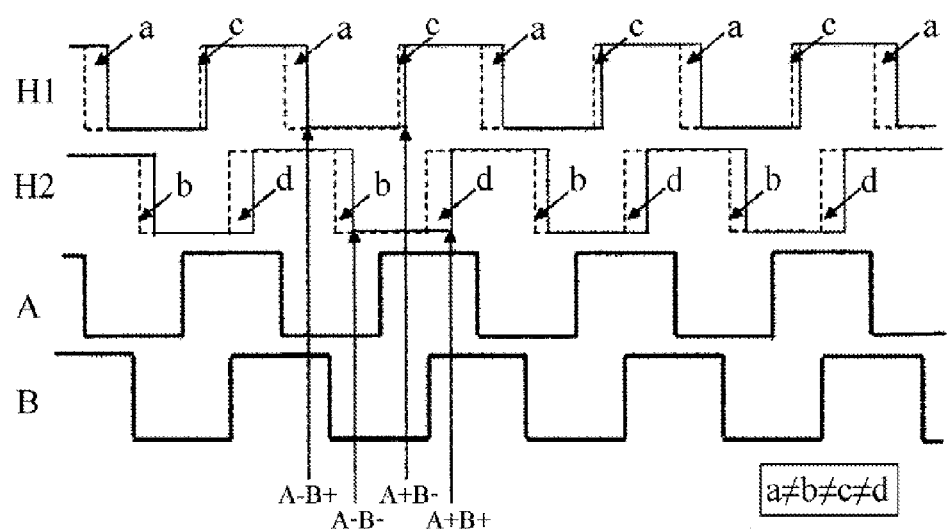
FIG. 19 is a waveform diagram that illustrates a difference of an error amount of the Hall device signal caused by the coil excitation.

FIG. 19 illustrates a relationship between the actual Hall device output (affected by the coil excitation) and the Hall device output in the non-excitation state.

The waveforms H1, H2 are signal outputs of the Hall devices 6a, 6b, and the waveforms A, B are driving signal outputs output from the motor driver 12 based on the drive pulse signal from the drive pulse signal processor 10 so as to excite the coils 4a, 4b of the motor. In addition, the waveforms H1, H2 are waveforms binarized by the Hall device signal detector 7 based on the output signal from the Hall device, and a broken line denotes a waveform in the non-excitation state, and a solid line denotes an excitation state or an actually detected waveform.

Figure 20:
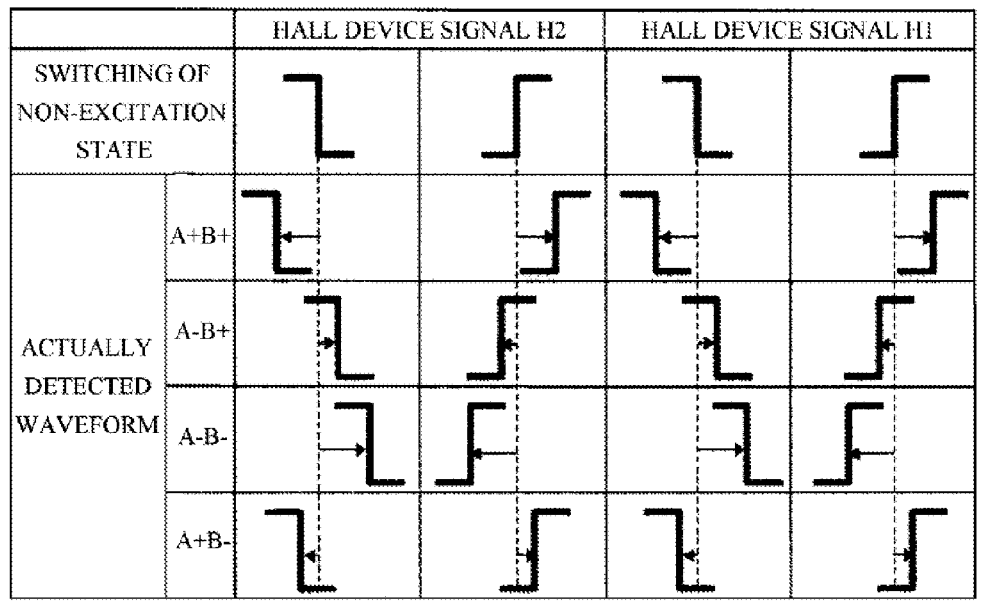
FIG. 20 is a waveform diagram that illustrates a difference of an error amount of the Hall device signal caused by the coil excitation.

The electrified excitation phase are sequentially switched as expressed by symbols of + and − attached to the right side of the letter A or B, such as (A−B+)→(A−B−)→(A+B−)→(A+B+)→(A−B+), but an error of the actually measured Hall device signal is different from the Hall device signal in the non-excitation state. FIG. 20 illustrates this state. Since the influence of the coil excitation on the Hall device signal scatters among the motor driving and individual motors, FIG. 20 illustrates an averaged error for each motor driving. Turning back to FIG. 19, a difference between an error amount "a" of the polarity change of the Hall device signal H1 when it is excited with the (A−B+) phase as a trailing change and an error amount "c" of the polarity change of the Hall device signal H1 when it is excited with the (A+B−) phase as a leading change affects a generation of the drive pulse signal or causes a phase shift of the drive pulse signal. This is true of the error amounts "b," "d" of the Hall device signal H2.

However, each of an error amount in the leading change and an error amount in the trailing change is constant for each step. The delay angle relative to the Hall device signal of the drive pulse signal is obtained separately at the leading time and at the trailing time of the drive pulse signal. A difference of an error amount caused by a difference of the excitation phase can be absorbed in the delay angle control in the brushless mode by generating the drive pulse signal by alternately utilizing the delay angles corresponding to the polarity changes at the leading time and at the trailing time of the drive pulse signal from which the delay angle has been obtained.

It is unnecessary for this embodiment to hold a delay angle as a fixed value that is set by taking the influence of the coil excitation into consideration, for a used delay angle, and a new delay angle is obtained whenever the electrification to the coil is switched. This embodiment can handle scattering errors of the Hall device signal among the individual difference of the motor. Thus, the driving velocity unevenness of the motor can be reduced even when no characteristic value is held for each individual motor, and the stable and highly precise motor driving can be realized.

Control Flow of Entire Driving

Referring now to flowcharts illustrated in FIGS. 14-16, a description will be given of a process flow for executing the driving sequence illustrated in FIG. 6.

Figure 14:
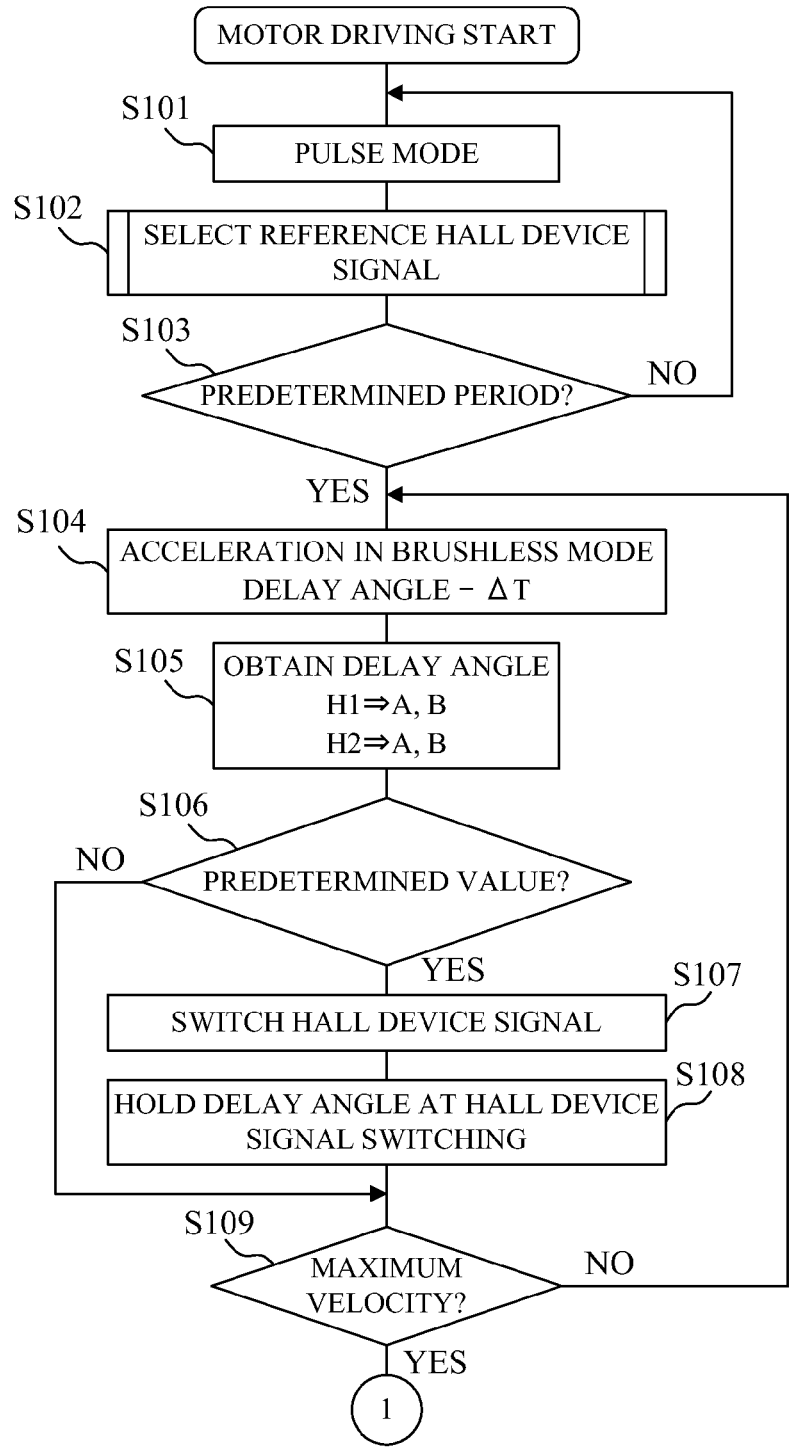
FIG. 14 is a flowchart that illustrates the acceleration control of the motor according to this embodiment.

Initially, the flowchart of FIG. 14 illustrates a process from a start of driving (start of the acceleration control) to the deceleration control of the stepping motor 1. In the following description, "S" stands for the step. The process illustrated in FIGS. 14-16 is executed by the microcomputer 11 in accordance with the computer program.

The microcomputer 11 serves as a signal switching unit configured to switch the reference signal or the reference Hall device signal between the two output signals from the two magnetic pole sensors 6a, 6b of the magnetic sensor 6. The microcomputer 11 also serves as an initial delay angle setting unit configured to set a delay angle between a signal that is different from a signal that is the reference Hall device signal among the two output signals from one of the magnetic sensors 6a, 6b just before the reference signal is switched and the drive pulse signal, to be an initial delay angle just after the reference signal is switched. The microcomputer 11 also serves as a driving mode switching unit configured to switch the mode between the pulse mode and the brushless mode.

In S101, the microcomputer 11 starts driving (the acceleration control over) the stepping motor 1 in the pulse mode. In the driving, in S102, the microcomputer 11 determines a reference Hall device signal, as described later.

In S103, the microcomputer 11 determines whether the control period reaches the predetermined period, and repeats the driving in the pulse mode if not. On the other hand, when it reaches the predetermined period, the procedure moves to S104.

In S104, the microcomputer 11 transfers the pulse mode to the brushless mode, and performs the delay angle operation that changes (increases or decreases) the delay angle at the acceleration time. At this time, in S105, the microcomputer 11 obtains the delay angle. More specifically, the Hall device signal H1 from the first magnetic pole sensor 6a and the delay angle that is a phase difference between the A-phase and B-phase drive pulse signals, the Hall device signal H2 from the second magnetic pole sensor 6b, and the delay angle that is a phase difference between the A-phase and the B-phase drive pulse signals are obtained. The microcomputer 11 repeats this delay angle operation until a value of the delay angle decreases down to the predetermined value.

In S106, the microcomputer 11 determines whether the delay angle has decreased down to the predetermined value, and if so the procedure moves to S107 so as to switch the reference Hall device signal. In S108, the microcomputer 11 stores (or holds) the delay angle used to switch the reference Hall device signal.

The microcomputer 11 repeats the above process until the rotating velocity of the stepping motor 1 reaches the target maximum velocity in S108.

Figure 15:
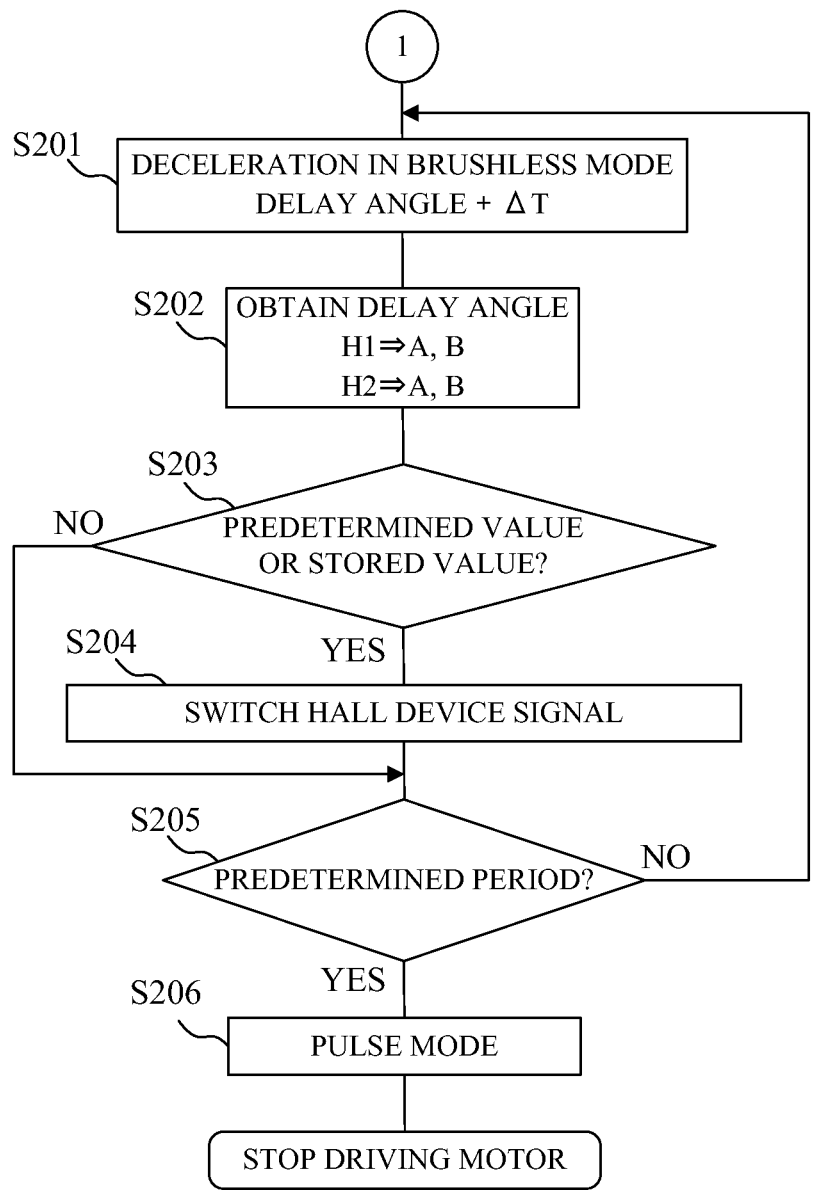
FIG. 15 is a flowchart illustrates the deceleration control of the motor according to this embodiment.

FIG. 15 illustrates a (first deceleration) process from when the rotating velocity of the stepping motor 1 reaches the target maximum velocity to when the procedure moves to the deceleration control to stop driving the stepping motor 1.

In S201, the microcomputer 11 provides the delay angle operation of the deceleration. At this time, in S202, the delay angle is obtained similar to S105. The microcomputer 11 performs the delay angle operation until the value of the delay angle increases up to the predetermined value (first predetermined value) in S203.

When the value of the delay angle is increased up to the predetermined value, the microcomputer 11 switches the reference Hall device (or reference) signal in S204.

Instead of the above first deceleration process, the following second deceleration process may be performed. In S201 and S202, the microcomputer 11 performs the delay angle operation of the deceleration and obtains the delay angle. In S203, when the value of the delay angle is increased up to the stored value of the delay angle at the acceleration control time, which has been held in S108 in FIG. 14, the microcomputer 11 switches the reference Hall device signal (or reference signal) in S204.

The microcomputer 11 repeats the control in S201 to S204 until the control period reaches the pulse mode switching period (predetermined period) in S205. When the control period reaches the pulse mode switching period, the microcomputer 11 moves to S206 and switches to the pulse mode, and stops the stepping motor 1 when the given drive pulses number is reached.

Figure 16:
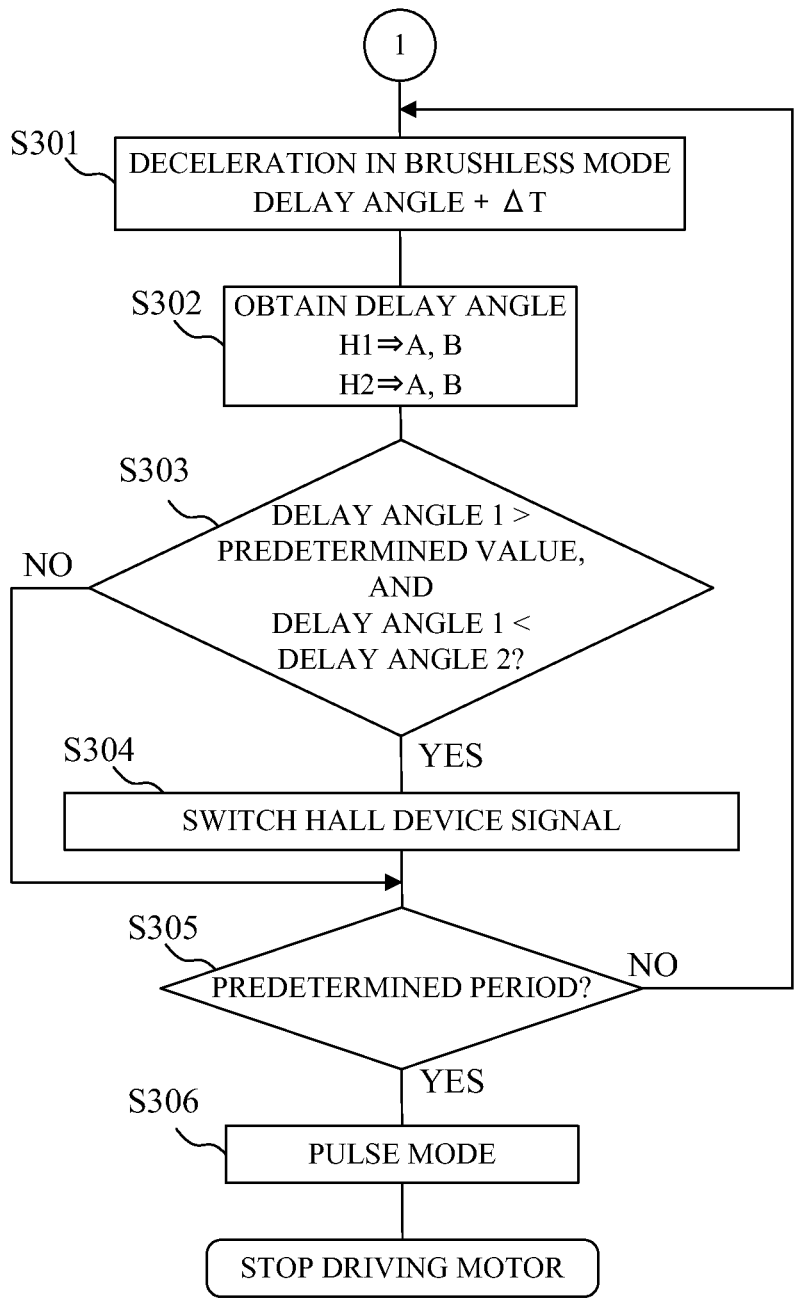
FIG. 16 is a flowchart that illustrates the other deceleration control of the motor according to this embodiment.

FIG. 16 illustrates a (third deceleration) process using the reference Hall device signal switching condition different from the process illustrated in FIG. 15 at the deceleration control time.

In S301, the microcomputer 11 performs the delay angle operation for the deceleration. In S302, the delay angle is obtained similar to S202 (S105). For example, when the A-phase drive pulse signal is generated using the Hall device signal H1, a delay angle between the Hall device signal H2 and the A-phase drive pulse signal is set to a delay angle 1, and a delay angle between the Hall device signal H1 and the A-phase drive pulse signal is set to a delay angle 2. At this time, in S303, the microcomputer 11 repeats the delay angle operation until the delay angle 1 becomes smaller than the delay angle 2 and the delay angle 1 is increased up to the (second) predetermined value that is a switching condition of the reference Hall device signal in the acceleration control.

When the condition in S303 is satisfied, the microcomputer 11 switches the reference Hall device signal (reference signal) in S304.

The microcomputer 11 repeats the above control until the control period reaches the pulse mode switching period (predetermined period) in S305. When the control period reaches the pulse mode switching period, the microcomputer 11 moves to S306 and switches the brushless mode to the pulse mode, and stops the stepping motor 1 when the given drive pulse number is reached.

Figure 17:
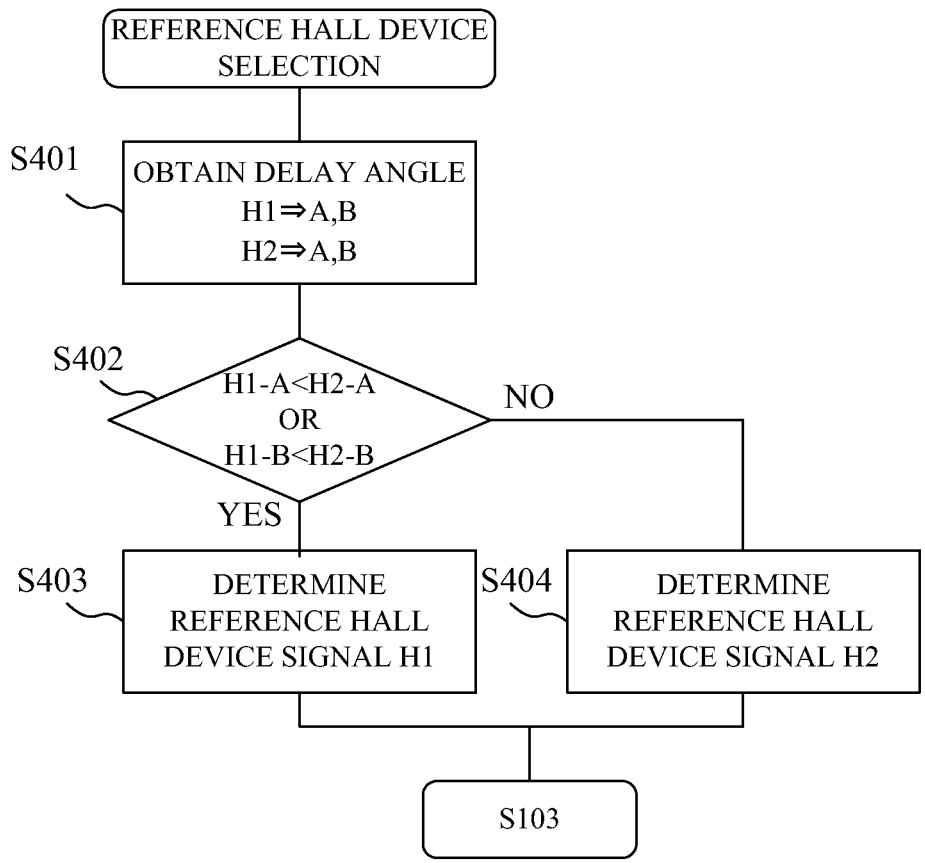
FIG. 17 is a flowchart that illustrates a Hall device selecting routine according to this embodiment.

The flowchart in FIG. 17 illustrates a process to select the reference Hall device signal when the pulse mode is switched to the brushless mode.

In S401, the microcomputer 11 obtains delay angles that are differences between the Hall device signals H1, H2, and the A-phase and B-phase drive pulse signals, similar to S105.

In S402, the microcomputer 11 compares the delay angles with each other. When the delay angle between the Hall device signal H1 and the A-phase and B-phase drive pulse signals (H1-A or H1-B, first delay angle) is smaller than the delay angle between the Hall device signal H2 and the A-phase and B-phase drive pulse signals (H2-A or H2-B, second delay angle), the procedure moves to S403. When the delay angle between the Hall device signal H2 and the A-phase and B-phase drive pulse signals is smaller than the delay angle between the Hall device signal H1 and the A-phase and B-phase drive pulse signals, the procedure moves to S404.

At this time, the first delay angle includes a delay angle (first leading delay angle) TH1 for a leading edge of the Hall device signal H1 and a delay angle (first trailing delay angle) TL1 for a trailing edge of the Hall device signal H1. In addition, the second delay angle includes a delay angle (second leading delay angle) TH2 for a leading edge of the Hall device signal H2 and a delay angle (second trailing delay angle) TL2 for a trailing edge of the Hall device signal H2. These delay angels are obtained whenever the electrification is switched or the polarity of the A-phase drive pulse signal or B-phase drive pulse changes.

The microcomputer 11 determines the reference Hall device signal used to generate the drive pulse signal at the transfer time to the brushless mode by repeating the above control.

Transfer from Pulse Mode to Brushless Mode

Figure 7:
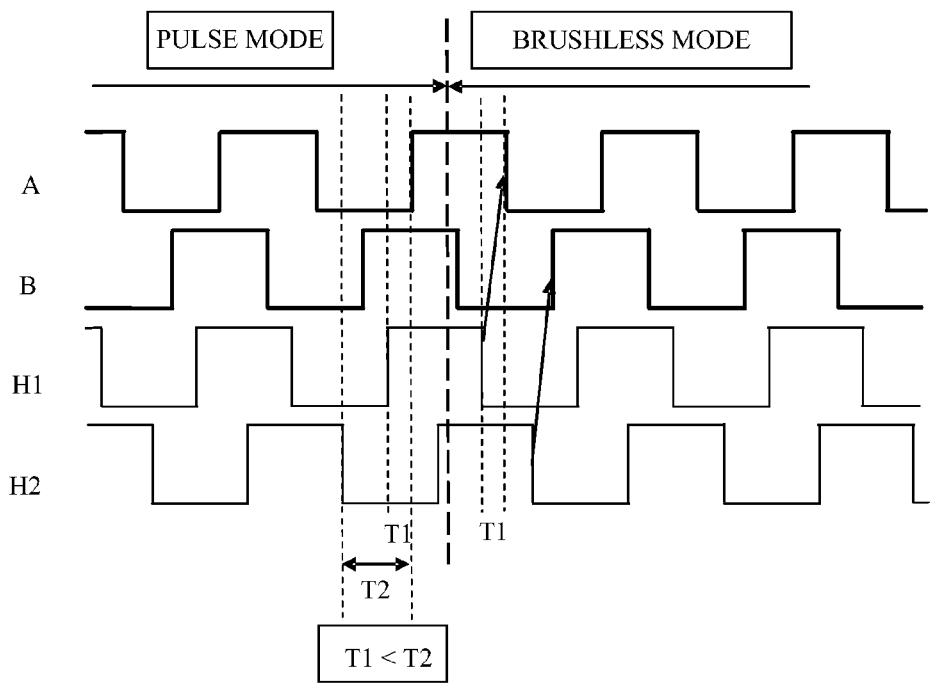
FIG. 7 is a signal waveform diagram that illustrates a transfer from a pulse mode to a brushless mode in the motor control apparatus according to this embodiment.

A description will now be given of a relationship between the above process and the change of the signal waveform. FIG. 7 illustrates a change of the signal waveform at the transfer time from the pulse mode to the brushless mode.

The microcomputer 11 (delay angle operator 9) obtains the delay angle T1 that is made by viewing the A-phase drive pulse signal based on the Hall device signal H1 and the delay angle T2 that is made by viewing the A-phase drive pulse signal based on the Hall device signal H2 whenever it switches the electrification in the driving in the pulse mode. At this time, a similar process is performed for the B-phase drive pulse signal. The obtained delay angles T1, T2 are not held but updated every time.

The microcomputer 11 compares the delay angle T1 that is based on the obtained Hall device signal H1 with the delay angle T2 that is based on the Hall device signal H2 whenever the electrification is switched. The comparison is not limited to one of the A-phase and B-phase drive pulse signals but the comparison of this embodiment utilizes the A-phase drive pulse signal.

When the predetermined period is reached in the driving in the pulse mode, the mode is transferred from the pulse mode to the brushless mode. The mode transfer condition is not limited to the above condition.

At the mode transfer time, the Hall device signal H1 having a smaller delay angle is used as a reference signal used to generate the A-phase drive pulse signal, and the delay angle T1 just before the reference signal is switched is set to the initial delay angle in the brushless mode.

In other words, smaller delay angles is compared that are based on just past polarity changes of the Hall device signals H1, H2 of the edge of the polarity change of the A-phase drive pulse signal just before the mode is transferred.

Figure 21:
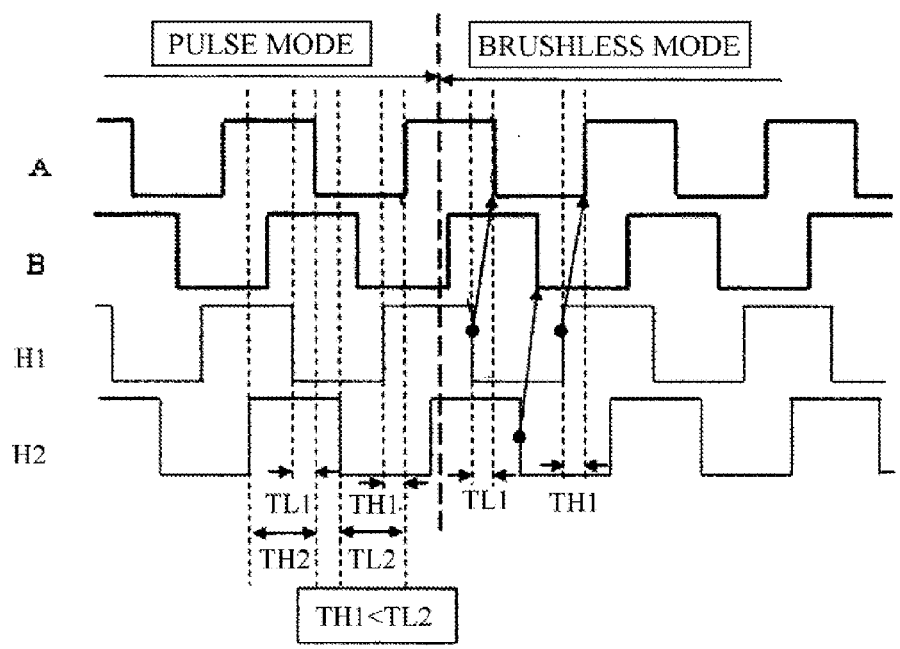
FIG. 21 is a waveform diagram for explaining the transfer from the pulse mode to the brushless mode.

More specifically, arrows of the drive pulse signals A, B from the Hall device signals H1, H2 illustrated in FIG. 21 denote leading edge and trailing edge of the Hall device signal used to determine the timing of the polarity change in the brushless mode in the brushless mode. Regarding the leading edge of the drive pulse signal, the corresponding leading delay angle TH1 of the Hall device signal H1 is used to generate the drive pulse signal when the leading delay angles of the drive pulse signal are compared. Regarding the trailing edge of the drive pulse signal, the trailing delay angle TL1 corresponding to the trailing edge of the Hall device signal H1 is used to generate the drive pulse signal because the Hall device signal H1 is selected as a reference signal. In the comparison between the delay angles TH1 and TL2 illustrated in FIG. 21, TL2 is smaller, the leading edge of the drive pulse signal is generated with the delay angle TL2 relative to the trailing edge of the Hall device signal H2, and the trailing edge of the drive pulse signal is generated with the delay angle TH2 for the leading edge of the Hall device signal H2.

At this time, a similar process is performed for the B-phase drive pulse signal. In addition, the delay angle T1 just before the reference signal is switched is reduced or subtracted by the predetermined angle ΔT at the mode transfer time, and the initial delay angle in the brushless mode may be set.

A smooth mode transfer can be realized by setting the initial delay angle in this way regardless of the individual difference of the stepping motor 1 or scattering of the detection values of the magnetic sensors. In addition, the influence of the phase shift of the drive pulse signal can be restrained due to the detection error of the magnetic sensor by selecting the Hall device signal having a smaller delay angle as the reference signal.

Acceleration/Deceleration Method in the Brushless Mode

In the acceleration in the brushless mode, the microcomputer 11 (delay angle operator 9) generates a new delay angle by reducing or subtracting the delay angle by a predetermined value ΔT which is obtained as the electric data from the phase difference between the Hall device signal and the drive pulse signal. The drive pulse signal is generated based on the delay angle. In other words, the acceleration control is performed by advancing the drive pulse signal whenever the electrification is switched.

In the deceleration in the brushless mode, the microcomputer 11 (delay angle operator 9) generates a new delay angle by increasing or adding the delay angle by the predetermined value ΔT which is obtained as the electric data from the phase difference between the Hall device signal and the drive pulse signal. The drive pulse signal is generated based on the delay angle. In other words, the deceleration control is performed by delaying the drive pulse signal whenever the electrification is switched.

Reference Hall Device Signal Switching in Acceleration in Brushless Mode

Figure 8A:
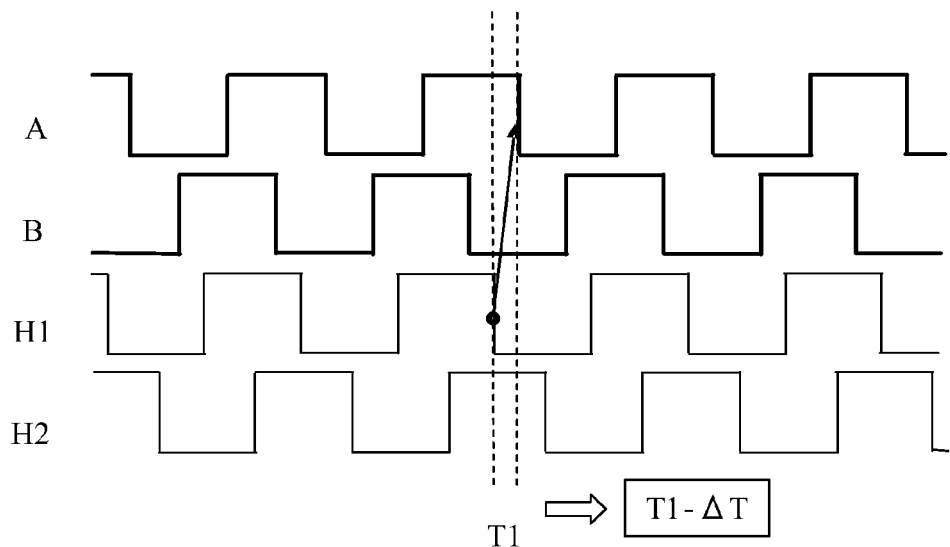
FIG. 8A illustrates a starting state of the acceleration control in the brushless mode according to this embodiment.

FIG. 8A illustrates the waveforms of the A-phase and the B-phase drive pulse signals and the Hall device signals H1, H2 when the acceleration control starts just after the pulse mode is transferred to the brushless mode. While this embodiment discusses that the A-phase drive pulse signal is generated based on the Hall device signal H1, this is applied to the generation of the B-phase drive pulse signal based on the Hall device signal H2.

Figure 8B:
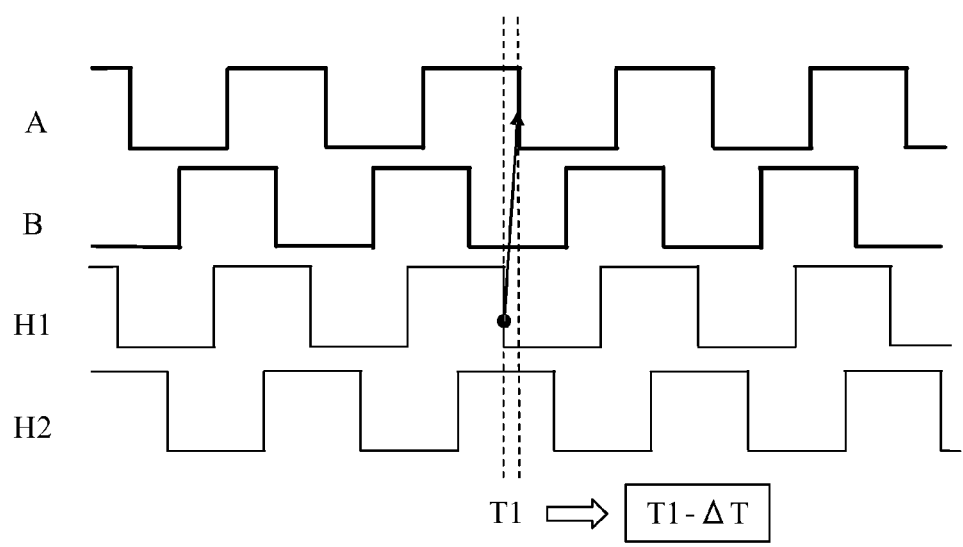
FIG. 8B illustrates an intermediate state of the acceleration control.
Figure 8C:
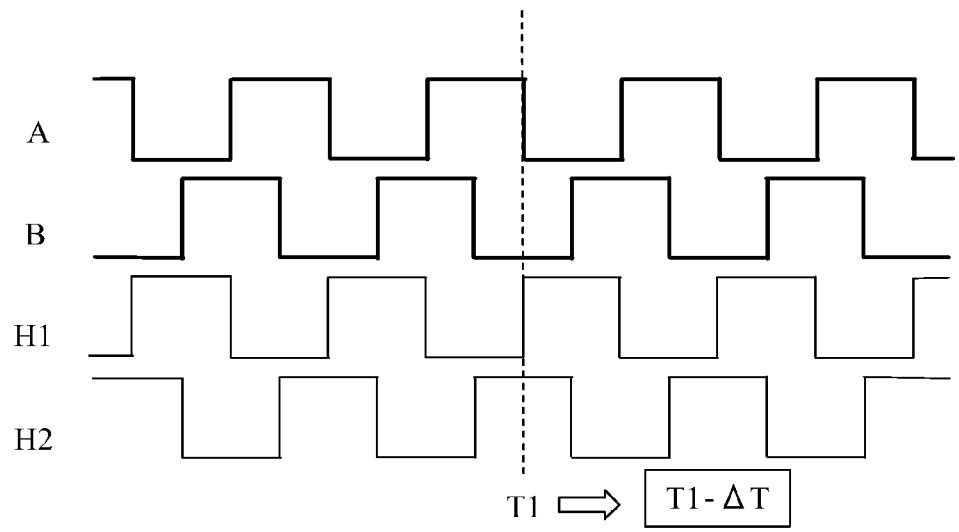
FIG. 8C illustrates a breakdown of the acceleration control.

The delay angle T1 obtained as electric angle data is subtracted or reduced by a predetermined value ΔT from the phase difference between the Hall device signal H1 and the A-phase drive pulse signal. When this delay angle operation proceeds, as illustrated in FIG. 8B, the phase difference between the Hall device signal H1 and the A-phase drive pulse signal gradually decreases, and finally the Hall device signal H1 and the A-phase drive pulse signal have the same phase as illustrated in FIG. 8C, and then this relationship reverses. As a result, when the Hall device signal generates the drive pulse signal, the algorithm contradicts due to the reversal of the signal relationship and the motor becomes out of control.

Figure 9:
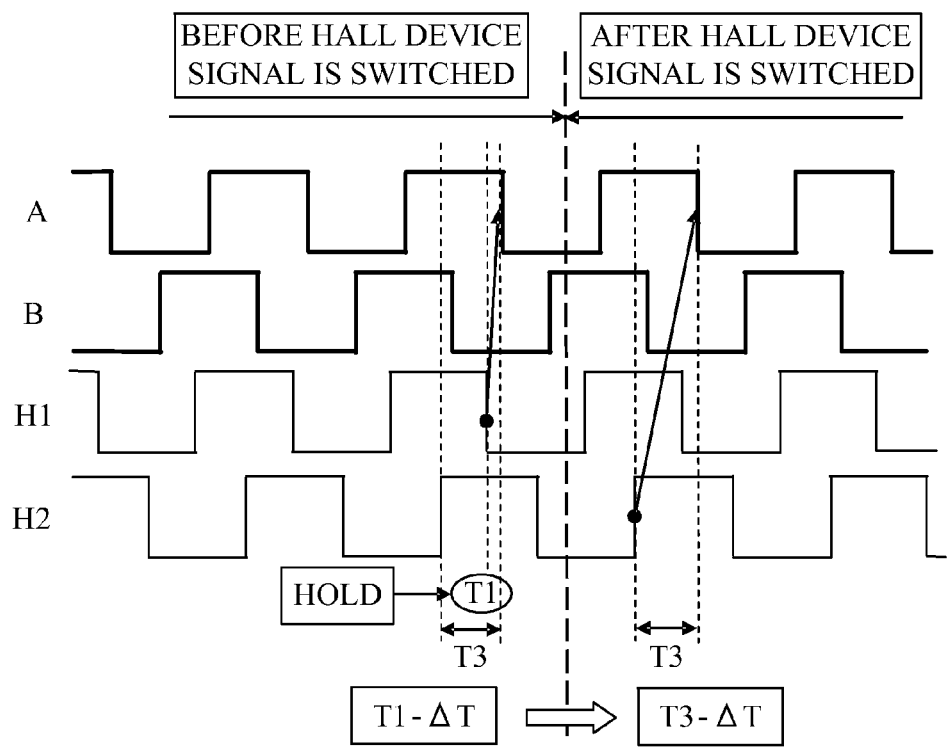
FIG. 9 is a signal waveform diagram that illustrates switching of a Hall device signal when a delay angle reaches a predetermined value in the acceleration control in the brushless mode according to this embodiment.

Accordingly, the microcomputer 11 in this embodiment switches, as illustrated in FIG. 9, the reference Hall device signal used to generate the A-phase drive pulse signal from the Hall device signal H1 to the Hall device signal H2 by reducing the delay angle T1 down to the predetermined value. FIG. 9 illustrates the waveforms of the A-phase and B-phase drive pulse signals and the Hall device signals H1, H2 before and after the reference Hall device signal is switched in the acceleration control in the brushless mode. Since the delay angle T1 at this time is used to determine whether the reference Hall device signal is switched in the deceleration control in the brushless mode, it is stored as a stored value.

The microcomputer 11 sets the delay angle T3 of the A-phase drive pulse signal to the initial delay angle just after switching, for the Hall device signal H2 which is a switching destination just before the reference Hall device signal is switched (or different from the reference Hall device signal just before switching). At this time, the delay angle T3 just before switching is subtracted and reduced by the predetermined value ΔT (or ΔT1), and may be set as an initial delay angle just after switching.

For the additional acceleration control, the microcomputer 11 performs the delay angle operation by subtracting or reducing the newly obtained delay angle T3 by predetermined value ΔT similar to the pre-switching state of the reference Hall device signal.

When the delay angle T3 reaches the predetermined value in the acceleration control, the microcomputer 11 again switches the reference Hall device signal used to generate the A-phase drive pulse signal to the Hall device signal H1 from the Hall device signal H2.

By repeating the delay angle operation and the reference Hall device signal switching, the rotating velocity of the stepping motor 1 is accelerated to the target maximum velocity. Similarly, in generating the B-phase drive pulse signal, the reference Hall device signal is switched to set the rotating velocity to the target maximum velocity.

Reference Hall Device Signal Switching in Deceleration in the Brushless Mode

Figure 10A:
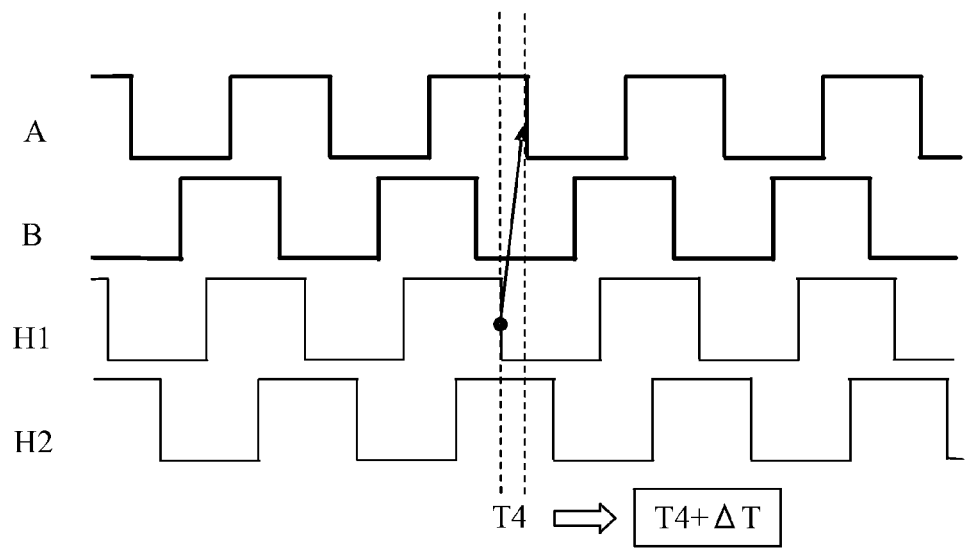
FIG. 10A illustrates a starting state in a deceleration control in the brushless mode according to this embodiment.

FIG. 10A illustrates the waveforms of the A-phase and B-phase drive pulse signals and the Hall device signals H1 and H2 after the rotating velocity of the stepping motor 1 is increased up to the target maximum velocity in the acceleration control in the brushless mode and just after the control is transferred to the deceleration control. This embodiment discusses the generation of the A-phase drive pulse signal based on the Hall device signal H1, but this is applied to the generation of the B-phase drive pulse signal based on the Hall device signal H2.

Figure 10B:
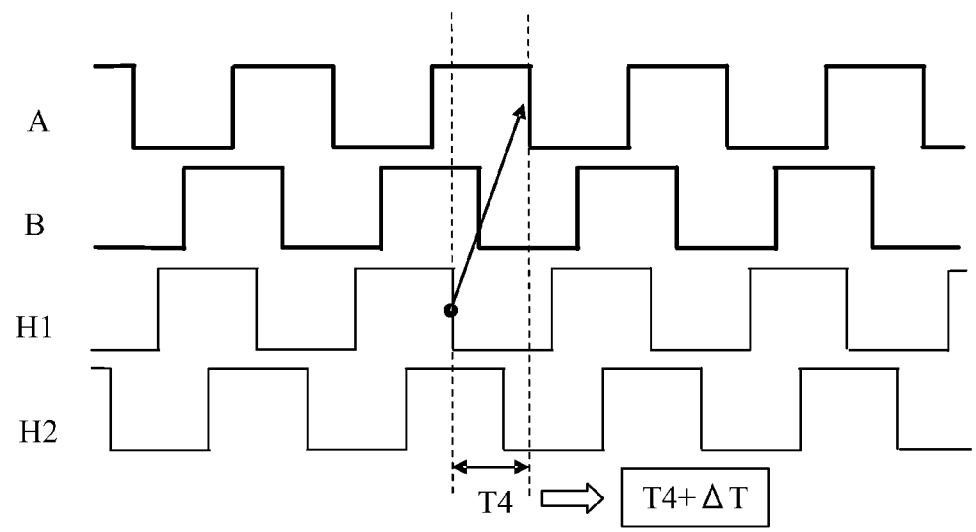
FIG. 10B illustrates an intermediate state in the deceleration control.

The delay angle T4 is increased and added by the predetermined value ΔT which is obtained as electric data from the phase difference between the Hall device signal and the drive pulse signal. When this delay angle operation proceeds, as illustrated in FIG. 10B, the phase difference between the Hall device signal H1 and the A-phase drive pulse signal gradually increases and the relationship between the Hall device signal and the drive pulse signal reverses similar to the acceleration control time.

Figure 11:
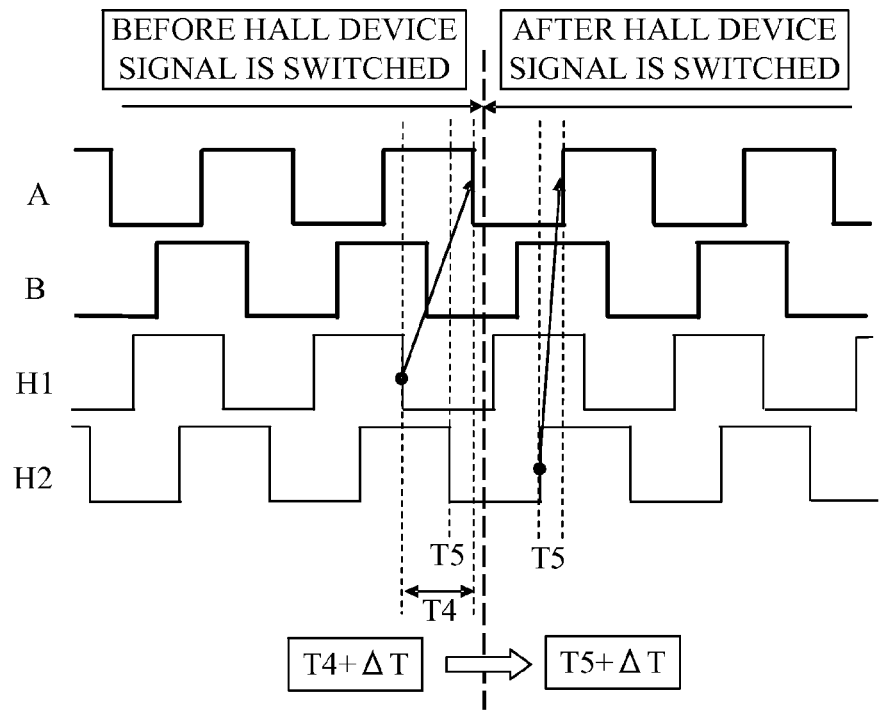
FIG. 11 is a signal waveform diagram that illustrates switching of the Hall device signal when a delay angle reaches a predetermined value in the deceleration control in the brushless mode according to this embodiment.

Accordingly, the microcomputer 11 in this embodiment switches, as illustrated in FIG. 11, the reference Hall device signal used to generate the A-phase drive pulse signal from the Hall device signal H1 to the Hall device signal H2 when the delay angle T4 is increased up to the predetermined value.

The microcomputer 11 sets a delay angle T5 of the A-phase drive pulse signal to the initial delay angle just after switching, for the Hall device signal H2 that is a switching destination just before the reference Hall device signal is switched (or different from the reference Hall device signal just before switching). At this time, the delay angle T5 just before switching is added and increased by the predetermined value ΔT, and may be set as an initial delay angle just after switching.

For the additional acceleration control, the microcomputer 11 performs the delay angle operation by subtracting or reducing the newly obtained delay angle T5 by predetermined value ΔT similar to the pre-switching state of the reference Hall device signal.

When the delay angle T5 reaches the predetermined value in the deceleration control, the reference Hall device signal used to generate the A-phase drive pulse signal is again switched from the Hall device signal H2 to the Hall device signal H1.

By repeating the delay angle operation and the reference Hall device signal switching, the deceleration is provided from the brushless mode down to the switching speed to the pulse mode. This embodiment calculates the velocity from the periodic data of the drive pulse signal, and switches the mode when the predetermined velocity is reached. However, the present invention is not limited to this embodiment. For example, the periodic data when the brushless mode is switched to the pulse mode is stored and the mode may be switched whenever the periodic data reaches the stored value.

Reference Hall Device Switching Based on Stored Value in Deceleration in Brushless Mode In the deceleration control in the above brushless mode, switching of the reference Hall device signal when the delay angle is larger than the predetermined value has been discussed but the following switching of the reference Hall device signal may be adopted. In other words, the delay angle when the reference Hall device signal is switched in the acceleration control in the brushless mode is stored as stored value (switching history). When the delay angle between the Hall device signal different from the reference Hall device signal in the deceleration control in the brushless mode and the generated drive pulse signal (or increased up to the stored value) is equal to the stored value, the reference Hall device signal is switched.

Figure 12:
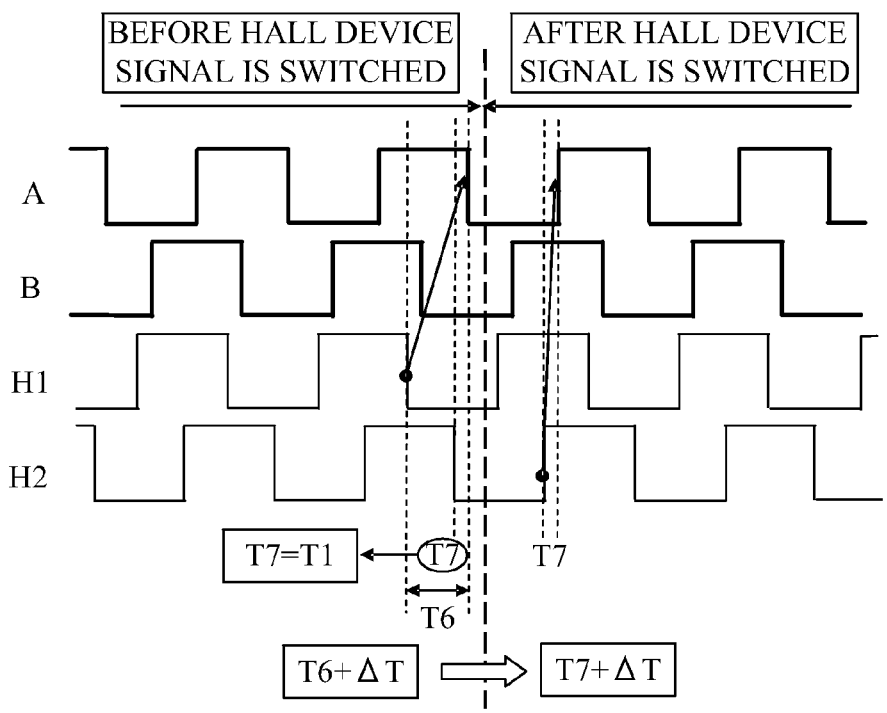
FIG. 12 is a signal waveform diagram that illustrates switching of the Hall device signal in the deceleration control in the brushless mode according to this embodiment.

FIG. 12 illustrates the waveforms of the A-phase and B-phase drive pulse signals and the Hall device signals H1 and H2 before and after the reference Hall device signal is switched in the deceleration control of the brushless mode. This embodiment discusses the generation of the A-phase drive pulse signal based on the Hall device signal H1, but this is applied to the generation of the B-phase drive pulse signal based on the Hall device signal H2.

The microcomputer 11 (delay angle operator 9) adds and increases by the predetermined value ΔT a delay angle T6 that is obtained as electric angle data from the phase difference between the Hall device signal H1 and the A-phase drive pulse signal. When this delay angle operation proceeds, the delay angle T7 obtained from the phase difference between the other Hall device signal H2 and the A-phase pulse signal reaches the delay angle T1 at the switching time of the reference Hall device signal held in the acceleration control in the brushless mode. In response, the microcomputer 11 switches the reference Hall device signal used to generate the A-phase drive pulse signal from the Hall device signal H1 to the Hall device signal H2.

The microcomputer 11 sets a delay angle T7 of the A-phase drive pulse signal to the initial delay angle just after switching, for the Hall device signal H2 that is a switching destination just before the reference Hall device signal is switched (or different from the reference Hall device signal just before switching). At this time, the delay angle T7 just before switching is added and increased by the predetermined value ΔT, and may be set as an initial delay angle just after switching.

The microcomputer 11 performs the delay angle operation that adds or increases the newly obtained delay angle T7 by the predetermined value ΔT, similar to the pre-switching state of the reference Hall device signal, for the additional deceleration control.

When this delay angle operation proceeds, a delay angle that is a phase difference between the Hall device signal H1 different from the reference Hall device signal and the A-phase drive pulse signal reaches a delay angle at the second switching time of the reference Hall device signal in the acceleration control in the brushless mode. In response, the microcomputer 11 switches the reference Hall device signal used to generate the A-phase drive pulse signal from the Hall device signal H2 to the Hall device signal H1.

The delay angle operation and the reference Hall device signal switching are performed for the generation of the B-phase drive pulse signal, and the deceleration control in the brushless mode is performed from the brushless mode to the switching velocity to the pulse mode.

Switching of the Reference Hall Device Signal Based on the Other Hall Device Signal Different from the Reference Hall Device Signal in the Deceleration in the Brushless Mode The following process may be performed in the reference Hall device signal switching in the deceleration control. The delay angle between the drive pulse signal and the reference Hall device signal used to generate the drive pulse signal is compared with the delay angle between the drive pulse signal and the other Hall device signal. The reference Hall device signal is switched, when the delay angle with the other Hall device signal is smaller than the delay angle with the reference Hall device signal and the delay angle with the other Hall device signal is increased up to the predetermined value that is the switching condition of the reference Hall device signal at the acceleration control time.

Figure 13:
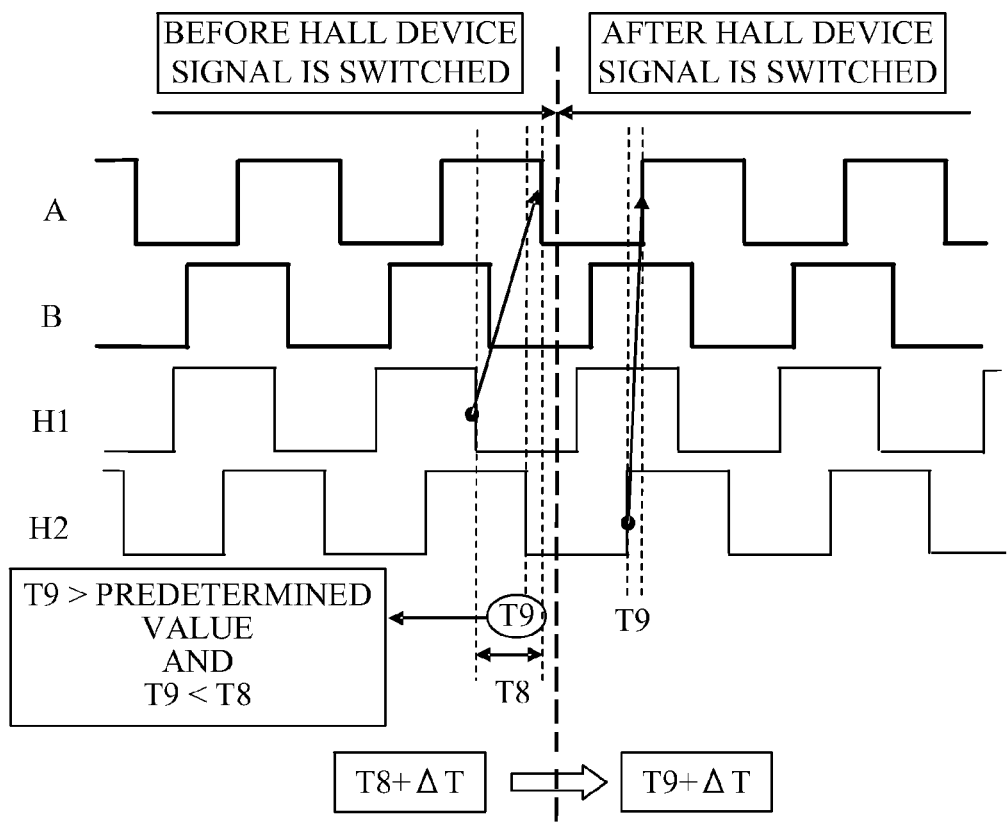
FIG. 13 is a signal waveform diagram that illustrates other switching of the Hall device signal in the deceleration control in the brushless mode according to this embodiment.

FIG. 13 illustrates the waveforms of the A-phase and B-phase drive pulse signals and Hall device signals H1, H2 before and after the reference Hall device signal in the deceleration control in the brushless mode. The embodiment discusses a generation of the A-phase drive pulse signal based on the Hall device signal H1, and this is applied to a generation of the B-phase drive pulse signal based on the Hall device signal H2.

The microcomputer 11 (delay angle operator 9) adds or increases by the predetermined amount ΔT (predetermined value ΔT2) a delay angle T8 that is obtained as electric angle data from the phase difference between the Hall device signal H1 and the A-phase drive pulse signal. Simultaneously, the delay angle T8 between the Hall device signal H1 and the A-phase drive pulse signal is compared with a delay angle T9 between the Hall device signal H2 and the A-phase drive pulse signal. When the delay angle T9 is smaller than the delay angle T8 and larger than the predetermined value that is the reference Hall device signal switching condition at the acceleration control time, the reference Hall device signal used to generate the A-phase drive pulse signal is switched from the Hall device signal H1 to the Hall device signal H2.

The microcomputer 11 sets the delay angle T9 of the A-phase drive pulse signal to the initial delay angle just after switching, for the Hall device signal H2 that is a switching destination just before switching of the reference Hall device signal (or different from the reference Hall signal just before switching). At this time, the delay angle T9 just before switching is added or increased by the predetermined value ΔT and may be set to an initial delay angle just after switching.

Moreover, the microcomputer 11 provides the delay angle operation so as to add or increase the newly obtained delay angle T9 by the predetermined value ΔT similar to the pre-switching state of the reference Hall device signal. Thereby, the additional deceleration control is performed by comparing the delay angle B between the Hall device signal H2 and the A-phase drive pulse signal with the delay angle A between the Hall device signal H1 and the A-phase drive pulse signal.

Thus, when the delay angle operation proceeds, the delay angle between the other Hall device signal H1 and the A-phase drive pulse signal becomes smaller than the delay angle between the other Hall device signal H2 and the A-phase drive pulse signal, and larger than the predetermined value that is the switching condition of the reference Hall device signal at the acceleration control time. In response, the microcomputer 11 switches the reference Hall device signal used to generate the A-phase drive pulse signal from the Hall device signal H2 to the Hall device signal H1.

By repeating the above delay angle operation and the reference Hall device signal switching in generating the B-phase drive pulse signal, the deceleration control in the brushless mode is performed from the brushless mode to the switching velocity to the pulse mode.

Switching from the Brushless Mode to the Pulse Mode

When the brushless mode is decelerated to the switching velocity to the pulse mode, the microcomputer 11 determines whether the polarity state of the drive pulse signal is high or low. Then, the electrifications to the first and second coils 4a, 4b are switched by according the initial output of the pulse mode with the polarity state of the mode switching point.

The microcomputer 11 that has switched from the brushless mode to the pulse mode due to the above procedure stops driving the stepping motor 1 when the count value of the drive pulse signal reaches the number of input drive pulses.

Application to Camera System

Figure 5:
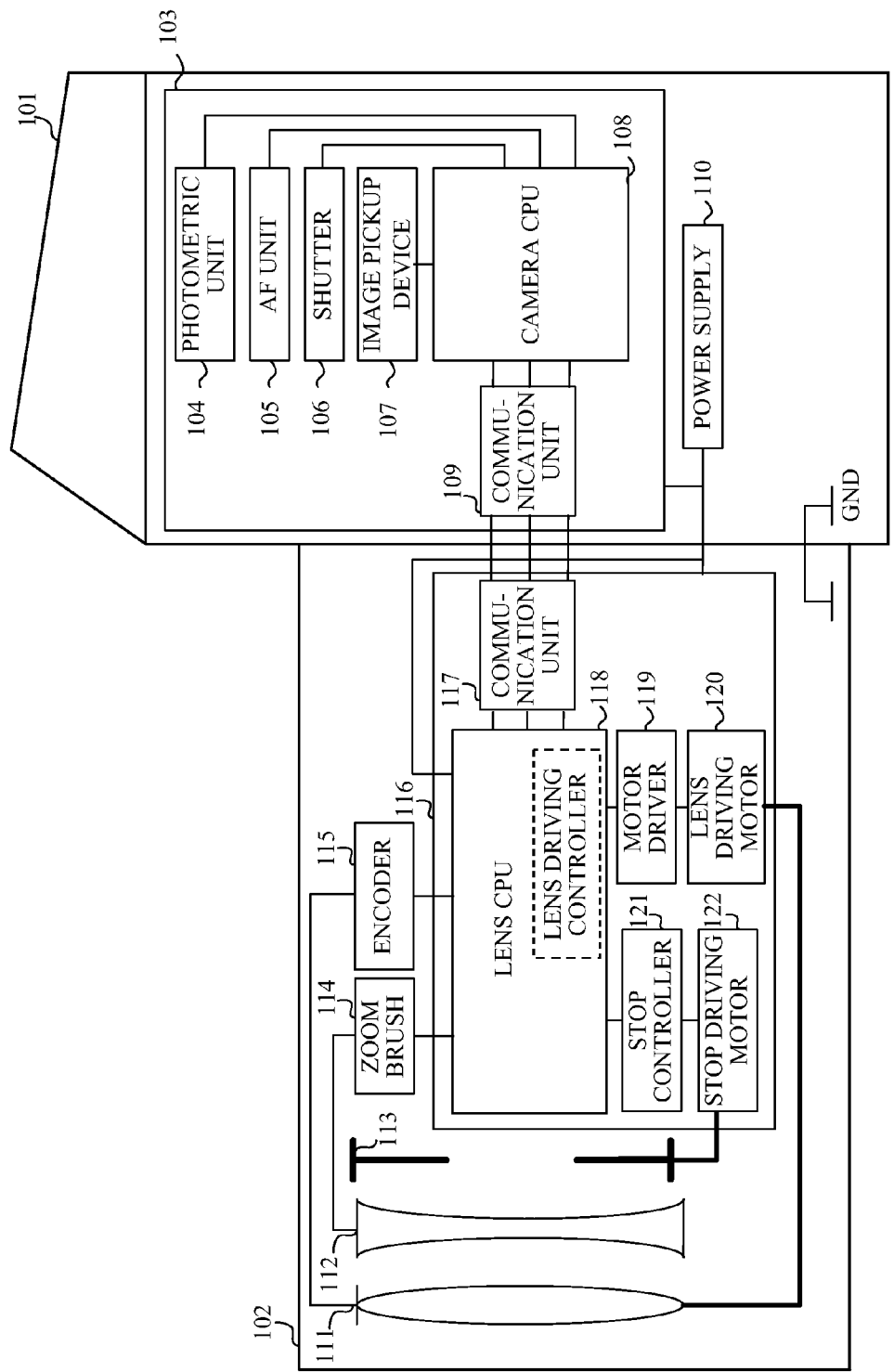
FIG. 5 is a view that illustrates a structure of the camera system using the motor control apparatus according to this embodiment.

A description will now be given of a camera system to which the above motor control apparatus is applied. FIG. 5 illustrates a structure example of the camera system that includes a single-lens reflex camera and an exchange lens that can be attached to and detached from the camera.

Reference numeral 101 denotes a camera, and reference numeral 102 denotes an exchange lens. An electric circuit unit 103 is provided in the camera 101. The electric circuit unit 103 includes a photometry unit 104 configured to measure a quantity of light that has passed an image pickup optical system in the exchange lens 102, and an AF unit 105 configured to detect a focusing state of the image pickup optical system and to control focusing of the image pickup optical system. The electric circuit unit 103 includes an image pickup device, such as a CCD and a CMOS sensor, configured to provide a photoelectric conversion of the object image formed by the image pickup optical system, and a shutter 106 configured to control exposure of the image pickup device 107. The electric circuit unit 103 further includes a camera CPU 108 configured to govern controls of each component in the camera 101, and a communication unit 109 configured to communicate with the exchange lens 102. In the camera 101, a power source 110 is provided and configured to supply power to both the camera 101 and the exchange lens 102.

The exchange lens 102 includes an image pickup optical system that includes a focus lens (optical element) 111 that is movable in the optical axis direction, a variable magnification lens 112, and a stop 113. The exchange lens 102 further includes a zoom position detecting brush 114 configured to detect a position of the variable magnification lens 112, an encoder 115 configured to detect a position of the focus lens 111, and an electric circuit unit 116.

The electric circuit unit 116 includes a communication unit 117 configured to communicate with the camera 101, a lens CPU 118 configured to control each component of the exchange lens 102, a lens driving motor 120 configured to move the focus lens 111, and a motor driver 119 configured to drive the motor 120. The electric circuit unit 116 includes a stop controller 121 configured to control operations of the stop 113, and a stop driving motor 122 configured to drive the stop 113.

The lens CPU 118 includes the microcomputer 11 illustrated in FIG. 4. The lens driving motor 120 corresponds to the stepping motor 1 illustrated in IFG. 1. The lens CPU 118 receives an output signal from a Hall device (magnetic sensor) provided to the lens driving motor 120, and the lens CPU 118 generates and sends to the motor driver 119 the A-phase and B-phase drive pulse signals. The motor driver 119 corresponds to the motor driver 12 illustrated in FIG. 4, and drives the lens driving motor 120 based on the input drive pulse signal.

Thus, this camera system repetitively switches, as described above, the reference Hall device signal that is a reference signal used to generate the drive pulse in the acceleration and deceleration in the brushless mode. Thereby, the lens driving motor 120 or the focus lens 111 can be accelerated or decelerated to the switching point to the pulse mode at the maximum target velocity.

As described above, this embodiment can repetitively switch the reference Hall device signal in the acceleration or deceleration in the brushless mode, and accelerates or decelerates the stepping motor to the switching point to the pulse mode at the target maximum velocity.

Since this embodiment obtains the delay angle whenever the electrifications to the coils 4a, 4b are switched, and provides the delay angle operation for the obtained delay angle, this embodiment can realize the motor control that is less likely affected by the individual difference of the stepping motor or the non-uniform detections of the Hall device signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2010-009846, filed on Jan. 20, 2010, and Japanese Patent Application No. 2010-054581, filed on Mar. 11, 2010, each of which is hereby incorporated by reference herein in its entirety.

What is claimed is:

1. A control apparatus configured to control driving of a motor that includes a rotor having a magnet, a first coil, and a second coil, the control apparatus comprising:
   first and second rotor position detectors arranged with different phases and configured to detect rotating positions of the rotor;
   a drive pulse signal generator configured to use as a reference signal one of a first signal output from the first rotor position detector and a second signal output from the second rotor position detector, and to generate a third signal that is a pulse signal used to drive the motor;
   a delay angle operator configured to change a delay angle that is a phase difference between the reference signal and the third signal;
   a driver configured to drive the motor based on the third signal;
   a signal switching unit configured to perform reference signal switching that switches the reference signal between the first signal and the second signal; and
   an initial delay angle setting unit configured to set a delay angle between the third signal and a signal different from a signal that is the reference signal just before the reference signal switching among the first signal and the second signal, to be an initial delay angle just after the reference signal switching.

2. The control apparatus according to claim 1, wherein the signal switching unit performs the reference signal switching when the delay angle reduced down to a predetermined value in an acceleration control of the motor.

3. The control apparatus according to claim 1, wherein the signal switching unit performs one of a first deceleration process, a second deceleration process, and a third deceleration process in a deceleration control of the motor, the first deceleration process being configured to perform the reference signal switching when the delay angle is increased up to a first predetermined value, the second deceleration process being configured to store a delay angle between the reference signal just after the reference signal switching and the third signal as a stored value in the acceleration control of the motor, and to perform the reference signal switching when a delay angle that is a phase difference between the third signal and one of the first signal and the second signal which one is not the reference signal is equal to the stored value in the deceleration control of the motor, and the third deceleration process being configured to compare a delay angle that is a phase difference between the first signal and the third signal with a delay angle that is a phase difference between the second signal and the third signal, and to perform the reference signal switching when a delay angle different from the delay angle changed by the delay angle operator is smaller and increased up to a predetermined value.

4. A control method of a control apparatus configured to control driving of a motor that includes a rotor having a magnet, a first coil and a second coil, and including first and second rotor position detectors arranged with different phases and configured to detect rotating positions of the rotor, the control method comprising the steps of:
   generating a third signal that is a pulse signal used to drive the motor by using as a reference signal one of a first signal output from the first rotor position detector and a second signal output from the second rotor position detector;
   changing a delay angle that is a phase difference between the reference signal and the third signal;
   driving the motor based on the third signal;
   performing reference signal switching that switches the reference signal between the first signal and the second signal; and
   setting a delay angle between the third signal and a signal different from a signal that is the reference signal just before the reference signal switching among the first signal and the second signal, to be an initial delay angle just after the reference signal switching.

5. An optical apparatus comprising:
   a motor that includes a rotor having a magnet, a first coil, and a second coil;
   an optical element moved by the motor; and
   a control apparatus configured to control driving of the motor,
   wherein the control apparatus includes:
   first and second rotor position detectors that are arranged with different phases and configured to detect rotating positions of the rotor;
   a drive pulse signal generator configured to use as a reference signal one of a first signal output from the first rotor position detector and a second signal output from the second rotor position detector, and to generate a third signal that is a pulse signal used to drive the motor;
   a delay angle operator configured to change a delay angle that is a phase difference between the reference signal and the third signal;
   a driver configured to drive the motor based on the third signal;
   a signal switching unit configured to provide reference signal switching that switches the reference signal between the first signal and the second signal; and
   an initial delay angle setting unit configured to set a delay angle between the third signal and a signal different from a signal that is the reference signal just before the reference signal switching among the first signal and the second signal, to be an initial delay angle just after the reference signal switching.

6. A control apparatus configured to control driving of a motor that includes a rotor having a magnet, a first coil, and a second coil, the control apparatus comprising:
   first and second rotor position detectors that are arranged with different phases and configured to detect rotating positions of the rotor;
   a drive pulse signal generator configured to use as a reference signal one of a first signal output from the first rotor position detector and a second signal output from the second rotor position detector, and to generate a third signal that is a pulse signal used to drive the motor;
   a delay angle operator configured to change a delay angle that is a phase difference between the reference signal and the third signal;

a driver configured to drive the motor based on the third signal; and a driving mode transfer unit configured to start driving the motor in a first driving mode that switches an electrification to each of the first and second coils at a predetermined time interval, to subsequently drive the motor in a second driving mode that switches the electrification in accordance with the delay angle, and to accelerate the motor to a target velocity, wherein the driving mode transfer unit sets as an initial delay angle of the second driving mode the delay angle between the third signal just before the first driving mode is transferred to the second driving mode and one of the first and second signals which provides a smaller delay angle with the third signal.

7. A control method of a control apparatus configured to control driving of a motor that includes a rotor having a magnet, a first coil, and a second coil, and including first and second rotor position detectors that are arranged with different phases and configured to detect rotating positions of the rotor, the control method comprising the steps of:

generating a third signal that is a pulse signal used to drive the motor by using as a reference signal one of a first signal output from the first rotor position detector and a second signal output from the second rotor position detector, changing a delay angle that is a phase difference between the reference signal and the third signal;

driving the motor based on the third signal;

starting driving the motor in a first driving mode that switches an electrification to each of the first and second coils at a predetermined time interval;

driving the motor in a second driving mode that switches the electrification in accordance with the delay angle; and accelerating the motor to a target velocity, wherein the delay angle between the third signal just before the first driving mode is transferred to the second driving mode and one of the first and second signals which provides a smaller delay angle with the third signal is set as an initial delay angle of the second driving mode.

8. An optical apparatus comprising:

a motor that includes a rotor having a magnet, a first coil, and a second coil:

an optical element moved by the motor; and a control apparatus configured to control driving of the motor, wherein the control apparatus includes:

first and second rotor position detectors that are arranged with different phases and configured to detect rotating positions of the rotor;

a drive pulse signal generator configured to use as a reference signal one of a first signal output from the first rotor position detector and a second signal output from the second rotor position detector, and to generate a third signal that is a pulse signal used to drive the motor;

a delay angle operator configured to change a delay angle that is a phase difference between the reference signal and the third signal;

a driver configured to drive the motor based on the third signal; and a driving mode transfer unit configured to start driving the motor in a first driving mode that switches an electrification to each of the first and second coils at a predetermined time interval, to subsequently drive the motor in a second driving mode that switches the electrification in accordance with the delay angle, and to accelerate the motor to a target velocity, wherein the driving mode transfer unit sets as an initial delay angle of the second driving mode the delay angle between the third signal just before the first driving mode is transferred to the second driving mode and one of the first and second signals which provides a smaller delay angle with the third signal.

* * * * *